(12) United States Patent
Stokes et al.

(10) Patent No.: US 9,132,948 B2
(45) Date of Patent: Sep. 15, 2015

(54) BEVERAGE CARRIER

(76) Inventors: Brett Stokes, Fallbrook, CA (US); Harry Lubin, Granada Hills, CA (US)

( * ) Notice: Subject to any disclaimer, the term of this patent is extended or adjusted under 35 U.S.C. 154(b) by 281 days.

(21) Appl. No.: 13/109,902

(22) Filed: May 17, 2011

(65) Prior Publication Data

US 2012/0292333 A1 Nov. 22, 2012

(51) Int. Cl.
| | |
|---|---|
| B65D 25/00 | (2006.01) |
| B65D 71/70 | (2006.01) |
| A47G 23/02 | (2006.01) |
| B60N 3/10 | (2006.01) |

(52) U.S. Cl.
CPC ............... *B65D 71/70* (2013.01); *A47G 23/02* (2013.01); *B60N 3/102* (2013.01); *B60N 3/103* (2013.01)

(58) Field of Classification Search
CPC .... B65D 71/70; B65D 21/02; B65D 21/0233; B65D 21/06; B65D 21/068; A47G 19/23; B60N 3/102; B60N 3/103
USPC .............. 220/737, 554, 556, 543, 527, 23.87, 220/23.89; 206/514, 201, 549, 217; 224/275; 229/117.11
See application file for complete search history.

(56) References Cited

U.S. PATENT DOCUMENTS

| | | | | |
|---|---|---|---|---|
| 2,510,591 | A | * | 6/1950 | Listman .................... 206/199 |
| 2,515,709 | A | * | 7/1950 | Heard et al. ............... 220/23.87 |
| 3,842,976 | A | * | 10/1974 | Dea .............................. 206/203 |
| 5,069,375 | A | | 12/1991 | Flick |
| 5,282,598 | A | * | 2/1994 | Greene ...................... 248/311.2 |
| 6,886,703 | B1 | * | 5/2005 | Bonner ........................ 220/4.03 |
| 6,932,214 | B1 | | 8/2005 | Zimet |
| D558,532 | S | * | 1/2008 | Peterson ....................... D7/615 |
| D588,199 | S | * | 3/2009 | Eisenbaum .................... D19/77 |
| 2008/0169397 | A1 | | 7/2008 | Somuah |
| 2008/0264987 | A1 | * | 10/2008 | Sarro et al. .................... 224/275 |

* cited by examiner

*Primary Examiner* — Jeffrey Allen
(74) *Attorney, Agent, or Firm* — Thibault Patent Group (57) ABSTRACT

Several embodiments of a beverage carrier are disclosed. In one embodiment, four side walls and a bottom are joined together to form an open box-type structure. The open box-type structure comprises an opening sized and shaped to allow a disposable drink carrier to be placed inside. The beverage carrier additionally comprises an insert for placing and retrieving the disposable drink carrier inside the box-type structure, the insert comprising a frame for receiving the disposable drink carrier and placement handles connected to the frame for raising and lowering the disposable drink carrier into and out of the box-type structure. Further, the beverage carrier comprises means for removably securing the box-type structure to a portion of a vehicle interior.

14 Claims, 11 Drawing Sheets

BEVERAGE CARRIER

BACKGROUND

I. Field of Use

The embodiments disclosed herein relates to the field transporting food and beverages. More specifically, several embodiments of an apparatus for transporting beverages is disclosed.

II. Description of the Related Art

In today's modern society, it has become commonplace to eat at fast-food establishments, restaurants, coffee shops, etc. Restaurants and other retail establishments often offer drive-through service as well. It is not uncommon for someone to order multiple food and drink items at these establishments at once on behalf of other people. For example, a mother or father may stop at a fast food restaurant to pick up food and beverages for their family. In another example, an office worker may be given a multi-drink order by co-workers and stop at a coffee shop to pick up the order.

Typically, beverages served at fast-food establishments, coffee shops, and other retail establishments are served in a wide variety of disposable cups and accompanying lids. In other instances, patrons may bring their own cup into these establishments and have it filled with the beverage of their choice. In any case, when a patron orders multiple beverages at these establishments, they are often given a disposable drink carrier to more easily transport their beverages. Such drink carriers are widespread, disposable, and generally a standard size. For example, most disposable drink carriers today are made of recycled cardboard, paper, or the like, and formed into a square or semi-square shape approximately 8½ inches on each side. Typically, these beverage carriers comprise four recessed areas specially formed to secure cups. Most disposable cups served by fast-food restaurants today use standard-sized cups having the same or similar-sized lower portions, no matter how large the cup. Thus, these disposable drink carriers are well-suited to carry a variety of fast-food cup sizes.

The recessed areas in typical drink carriers are shaped to hold the cup firmly in place during beverage transport, while allowing easy removal once the beverages have arrived at a given destination. However, even though these popular beverage carriers are designed to hold beverages in place during transport, they are notorious for allowing drinks to become dislodged, for example, while negotiating turns in a vehicle. Especially problematic recently is the advent of very tall cups designed to hold large amounts of liquid. This design, coupled with the aforementioned standard-sized lower cup portion, renders them top heavy, easily becoming dislodged from their setting within beverage carriers and causing spills to occur.

Further, there is no provision designed into beverage carriers to prevent them from sliding around, for example, on vehicle seats, in vehicle trunks, or vehicle floors. Again, spills are commonplace as the carrier is free to slide around inside the vehicle interior.

Another disadvantage of these beverage carriers is that once a spill occurs, there is little or no provision to either catch the spilled liquid or provide a reservoir in which the spilled liquid can remain until it can be cleaned up. Furthermore, these beverage carriers do little insulate the beverages that they carry, allowing hot drinks to cool and cold drinks to warm.

It would be desirable to transport multiple beverages using these common beverage carriers while preventing the carriers from sliding inside vehicles. It would further be desirable to prevent beverages from tipping over while they are seated within beverage carriers. It would be still further desirable if spills would be contained so that they would not ruin vehicle interiors. Finally, it would desirable if multiple beverages could be transported using these beverage carriers, while helping to keep hot beverages hot and cold beverages cold.

SUMMARY

The embodiments described herein relate to a beverage carrier. In one embodiment, a beverage carrier comprises four side walls and a bottom joined together to form an open box-type structure, wherein the open box-type structure comprises an opening, sized and shaped to allow a disposable drink carrier to be placed inside the box-type structure. The beverage carrier further comprises an insert for placing and retrieving the disposable drink carrier inside the box-type structure, the insert comprising a frame for receiving the disposable drink carrier and placement handles connected to the frame for raising and lowering the disposable drink carrier into and out of the box-type structure. Further, the beverage carrier comprises means for removably securing the box-type structure to a portion of a vehicle interior.

BRIEF DESCRIPTION OF THE DRAWINGS

The features, advantages, and objects of the various embodiments will become more apparent from the detailed description as set forth below, when taken in conjunction with the drawings in which like referenced characters identify correspondingly throughout, and wherein:

FIG. 8b is a top, plan view of a stop structure located on the insert shown in FIG. 8a.

DETAILED DESCRIPTION

Figure 1:
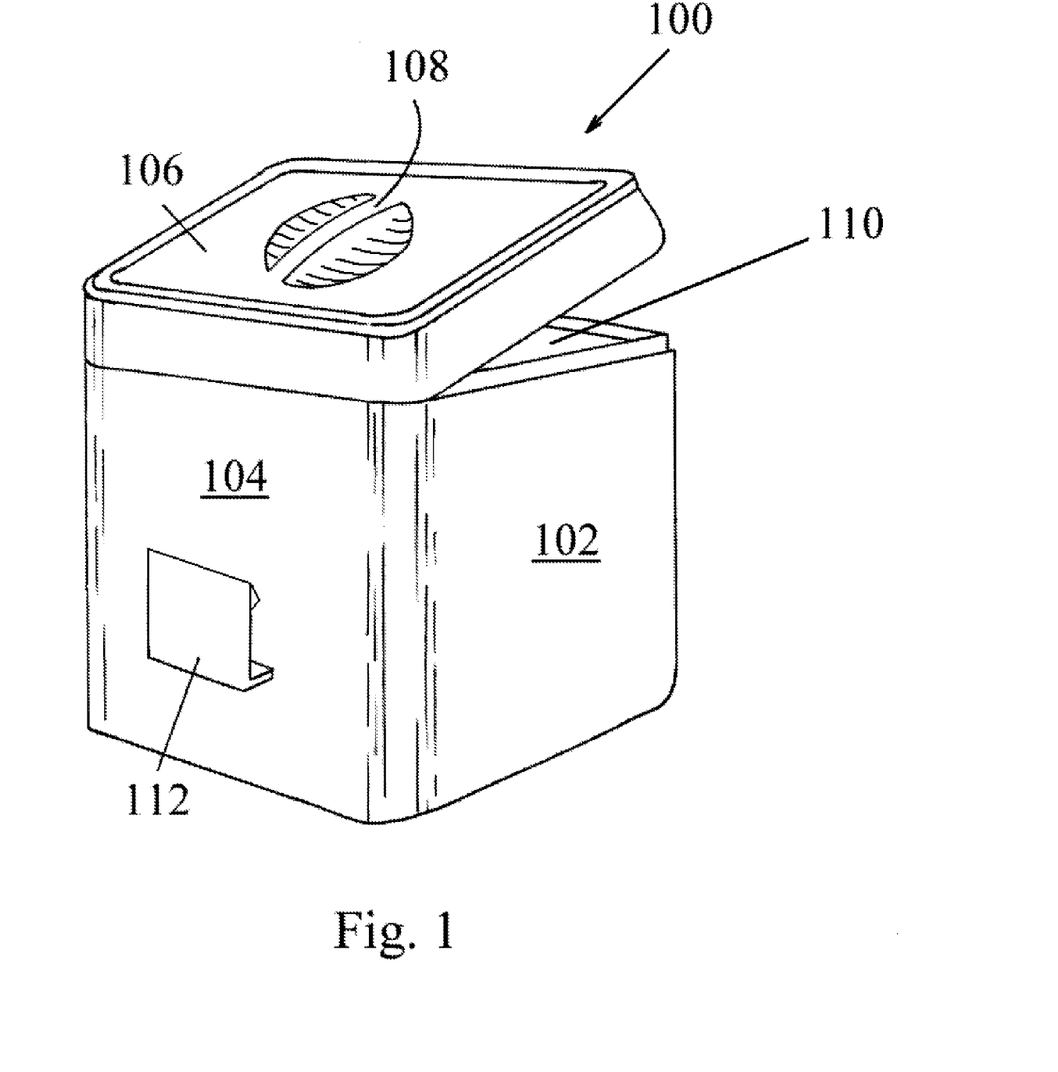
FIG. 1 is a rear, three-quarter perspective view of one embodiment of a beverage carrier.

FIG. 1 is a rear, three-quarter perspective view of one embodiment of a beverage carrier 100. Beverage carrier 100 is a portable device for transporting beverages from one location to another, typically in a vehicle. In the embodiment shown in FIG. 1, beverage carrier 100 comprises a first side wall 102, a rear side wall 104, a second side wall (not shown), a front side wall (not shown), and a bottom (not shown), forming an open box-type structure. Also shown is an optional lid 106. Beverage carrier 100 also comprises an insert (not shown) that is used to place a standard, disposable drink carrier inside during transportation of the drink carrier and remove the drink carrier upon arrival at a destination. In this embodiment, beverage carrier 100 comprises a square shape, although in other embodiments, beverage carrier 100 comprises other geometric shapes and, therefore, could have a greater, or fewer, number side walls. In addition, the geometric shape of the beverage carrier 100 exterior need not coincide with the geometric shape of its interior. In another embodiment, the external shape of beverage carrier 100 comprises a cylinder. In any of these embodiments, however, an inside cross section of beverage carrier 100 is sized and shaped to accommodate a common, disposable drink carrier that is widely used in the fast-food industry today, as will be explained in greater detail below.

Beverage carrier 100 comprises optional lid 106 for covering the contents placed within beverage carrier 100. The lid may be attached to rear side wall 104 by a hinge, hinge/spring combination, or it may be manufactured as part of rear side wall 104 using techniques well known in the art. Lid 106 may comprise handle 108, allowing easy transport of beverage carrier 100. Handle 108 may be formed by integrating it into lid 106 as shown, or it may comprise handle that is connected to the surface of lid 106 either directly, or using a swivel-pin connection that is well-known in the art.

Beverage carrier 100 additionally comprises a means 112 for removably securing beverage carrier 100 to a portion of a vehicle interior. As shown in this embodiment, the means for removably securing beverage carrier 100 comprises a clip that is attached to rear side wall 104. The clip is positioned on rear side wall 104 such that it can be easily attached to a seat belt strap inside a vehicle while beverage carrier 100 rests on a vehicle seat during transport. Typically, a seat belt in a non-occupied vehicle seat is fastened, providing either a lap restraint belt or a shoulder restraint belt available for use with the clip. In other embodiments, the clip can comprise two sections, one section secured to rear side wall 104 and the second section attached to the first section via a spring-loaded hinge. In this arrangement, the second section conveniently pivots during attachment to a seat belt strap.

In the embodiment of FIG. 1, beverage carrier 100 is approximately 7 inches tall, while lid 106 adds about 4 inches to that figure. In this embodiment, beverage carrier 100 comprises an external cross-section that is square, with each side wall measuring approximately ten inches in width. In other embodiments, these dimensions could be altered, however opening 110 must be large enough to receive standard-sized drink carriers and tall enough to accommodate anticipated drink sizes, as will be discussed below.

Beverage carrier 100 is typically manufactured from a rigid or semi-rigid material, such as fiberglass, plastic, polyurethane, metal, wood, or any other similar materials. beverage carrier 100 may be manufactured using well-known techniques, such as injection molding, extrusion, hogging, or other techniques. The sides and bottom of the beverage carrier 100 could be manufactured using individual sections joined together by such techniques as gluing, welding, riveting, etc., or the sides and/or bottom may be manufactured as a single unit using the aforementioned injection molding, extrusion, or hogging processes.

Figure 1A:
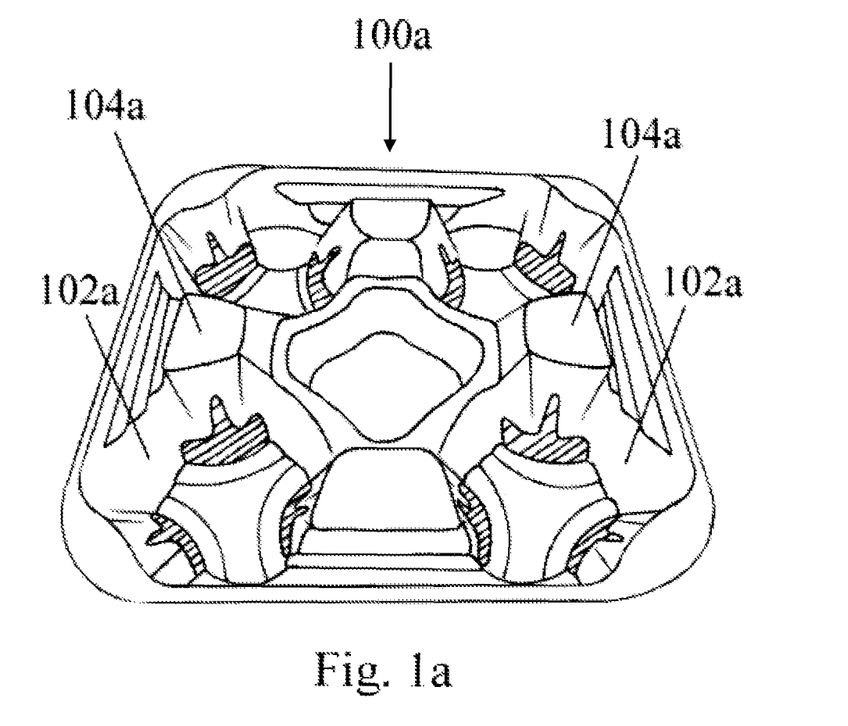
FIG. 1a is a perspective view of a typical, disposable drink carrier.

FIG. 1a is a perspective view of a standard, disposable drink carrier 100a widely used in the fast-food industry today. Disposable drink carrier 100a typically comprises four recesses 102a for holding cups of various sizes. Each of the recesses 102a is typically fairly shallow, such that cups are recessed only slightly below a top surface 104a of disposable drink carrier 100a while they are held by the recesses 102a. Disposable drink carrier 100a is typically constructed of cardboard or "chipboard" so that they are sturdy, while also having the attribute of being able to absorb small spillage or seepage from the cups that they hold. A typical size of the disposable drink carrier is 8½ inches by 8¾ inches and 2 inches tall, although these measurements can vary depending on the particular disposable drink carrier.

Figure 2:
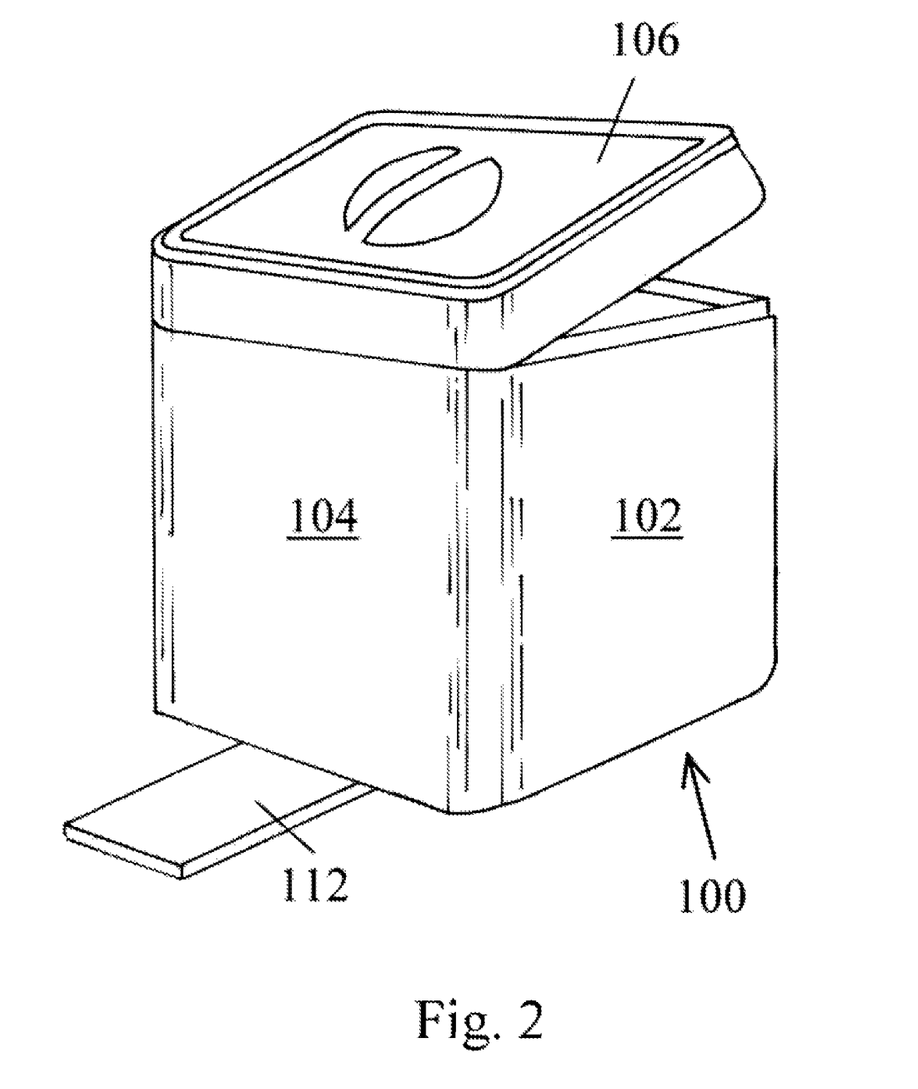
FIG. 2 is a perspective view of the beverage carrier shown in FIG. 1, illustrating an alternative embodiment of a means for removably securing the beverage carrier of FIG. 1 to a portion of a vehicle interior.

FIG. 2 is a perspective view of a beverage carrier 100, illustrating an alternative embodiment of the means 112 for removably securing beverage carrier 100 to a portion of a vehicle interior. In this embodiment, the means 112 for removably securing beverage carrier 100 to a portion of a vehicle interior comprises a "tail" that is attached to the junction between rear side wall 104 and the bottom of beverage carrier 100 (not shown). In other embodiments, the "tail" could be attached to the rear side wall 104 of beverage carrier 100, to the bottom of beverage carrier 100, or even to one or both sides of beverage carrier 100. In another embodiments, multiple "tails" could be attached to various portions of beverage carrier 100.

The "tail" 112 is used to secure beverage carrier 100 to a vehicle seat by sliding the tail 112 between a vehicle seat and a vehicle seat back. The "tail" is constructed so that it's length, width, and/or thickness aids in providing a friction-based fit between the vehicle seat and the vehicle seat back. During travel, beverage carrier 100 is prevented from moving on the vehicle seat by virtue of the tail.

Figure 3:
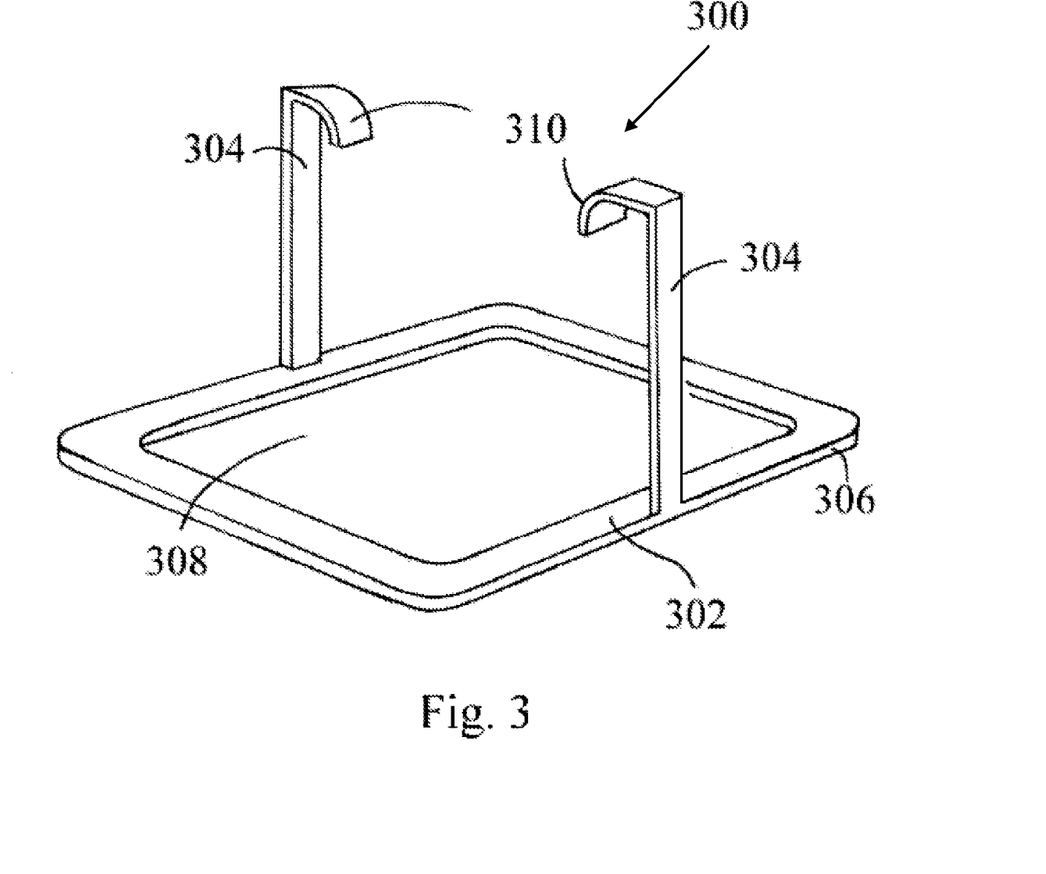
FIG. 3 is a perspective view of an insert that is used to place a disposable drink carrier inside the beverage carrier of FIG. 1.

FIG. 3 is a perspective view of one embodiment of an insert 300 that is used to place a disposable drink carrier (and accompanying drinks) inside beverage carrier 100. Insert 300 comprises a frame 302 and two placement handles 304. Frame 302 forms an opening 308 that is sized and shaped to receive a standard-sized beverage carrier. A typical, disposable drink carrier, such as the one shown in FIG. 1a, is approximately 8¾ inches square. Therefore, the opening 308 is slightly smaller than this, measuring approximately 8⅝ wide in both dimensions, such that when a drink carrier is placed within opening 308, a lower, outer perimeter of the drink carrier rests on top of, and is supported by, an upper surface of frame 302. An outer edge 306 of frame 304 is formed to fit closely with a cross-section of beverage carrier 100 (i.e., opening 110 in FIG. 1) so that insert 300 may be lowered and raised within beverage carrier 100 without difficulty, while maintaining a fit that prohibits excess movement of insert 300 within beverage carrier 100. Placement handles 304 optionally comprise hooks 310 that allow a user to easily pick the insert 300 up. The hooks 310 may comprise a variety of shapes and sizes in other embodiments.

Construction of insert 300 typically comprises formation using injection molding techniques that are well-known in the art. Thus, a typical formation of insert 300 comprises a one-piece structure. Insert 300 may be constructed of one of a variety of common materials, such as plastic, polyethylene, or other similar materials.

Figure 4:
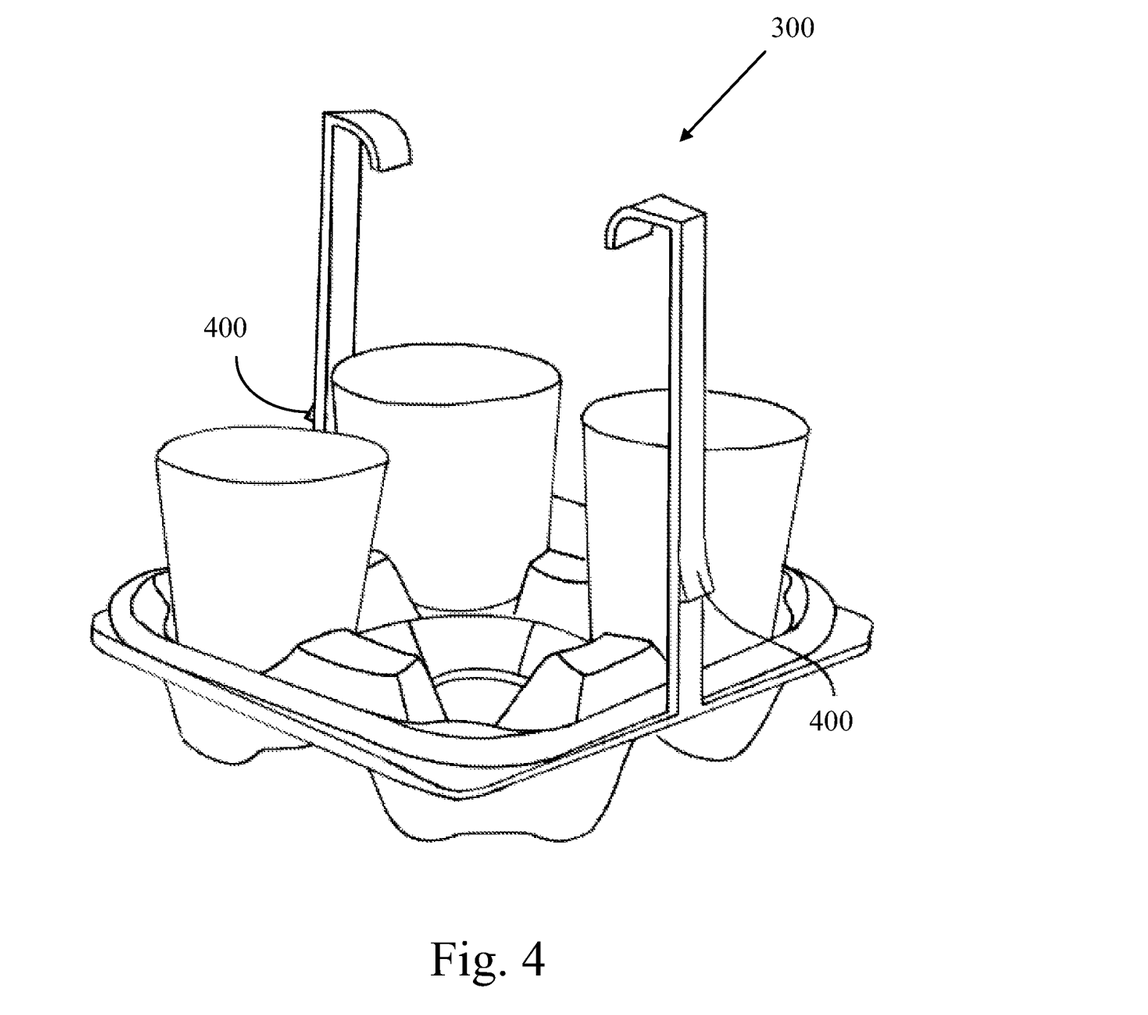
FIG. 4 is a perspective view of a loaded, disposable drink carrier positioned within the insert of FIG. 3.

In one embodiment, insert 300 may be placed on a surface, and then a disposable drink carrier (with drinks) placed inside opening 308. Insert 300 is then lifted using the two placement handles 304. As this occurs, a portion of the beverage carrier protrudes down through opening 308 as a perimeter of beverage carrier makes contact with frame 302. At this point, the beverage carrier is disposed within insert 300 as shown in FIG. 4 and may now be lowered into beverage carrier 100. Also shown in FIG. 4 is optional flange 400, which will be described in more detail with reference to FIG. 6. The flange 400 is used to help load a disposable drink carrier into insert 300 while insert 300 is located inside beverage carrier 100, as will be described later herein with respect to FIGS. 7a and 7b.

Figure 5:
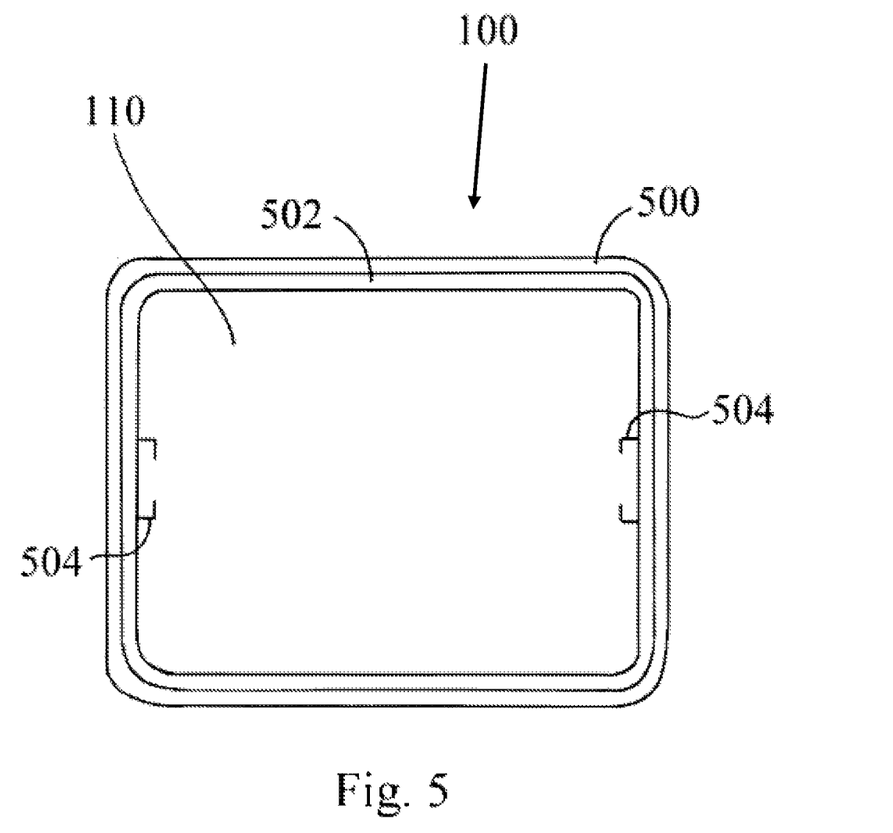
FIG. 5 is a top plan view of one embodiment of the beverage carrier shown in FIG. 1.

FIG. 5 is a top plan view of one embodiment of the beverage carrier 100 of FIG. 1. Shown is beverage carrier opening 110 formed by rim 500, optional insulating layer 502, and optional guides 504. Not shown is the optional lid 106 of FIG. 1. In one embodiment, insulating layer 502 comprises an extra layer of material formed on the side walls and bottom of beverage carrier 100. Insulating layer 502 may be provided to keep hot beverages hot and cold beverages cold, and may comprise any well-known insulating material, such as plastic, fiberglass, polyethylene, etc. In another embodiment, insulating layer may be absent, or the construction of beverage carrier 100 may be manufactured of materials that inherently comprise insulating characteristics, thereby eliminating the need for a separate insulating layer.

The beverage carrier 100 shown in FIG. 5 additionally comprises optional guides 504, which extend longitudinally along inner side walls of beverage carrier 100, as shown. In other embodiments, the number of guides 504 used may be greater than, or less than, the two guides 504 shown in FIG. 5. Further, guides 504 could be placed on adjacent inner side walls in other embodiments. The guides 504 may extend the entire length of the inner side walls, or they may extend only partially, or they may be broken up into several sections along the inner side walls. The guides 504 are formed to receive placement handles 304 of insert 300 so that insert 300 slides easily within beverage carrier 100.

Figure 6:
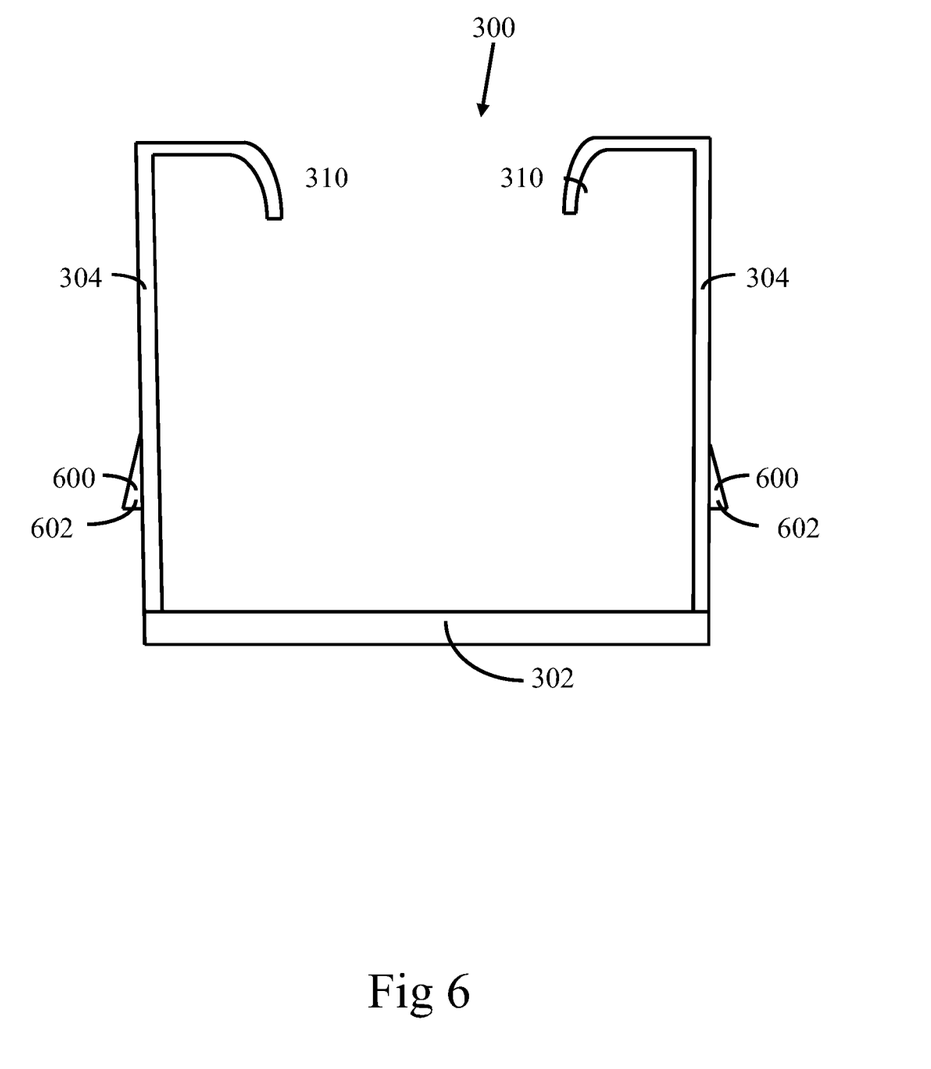
FIG. 6 is a side view of one embodiment of the insert of FIG. 3.

FIG. 6 is a side view of one embodiment of insert 300, showing frame 302, placement handles 304, and hooks 310. Also shown are flanges 600 (first shown as flanges 400 in FIG. 4), located as shown on placement handles 304. The flanges 600 comprise a surface 602 that is designed to engage a rim of beverage carrier 100 when insert 300 is raised from a lowered position inside beverage carrier 100 to a raised position. The wedge-shaped design of flange 600 may be altered in other embodiments, so long as the flanges prevent insert 300 from being lowered into beverage carrier 100 during loading of insert 300, while also allowing insert 300 to be lowered into beverage carrier 100 just prior to transport. Flanges 600 could alternatively comprise a knob or a spring-loaded object that extends from the surface of the placement handles 304 and retracts when the insert is pushed downwards with enough force to overcome the spring force holding the object in the extended position.

Figure 7A:
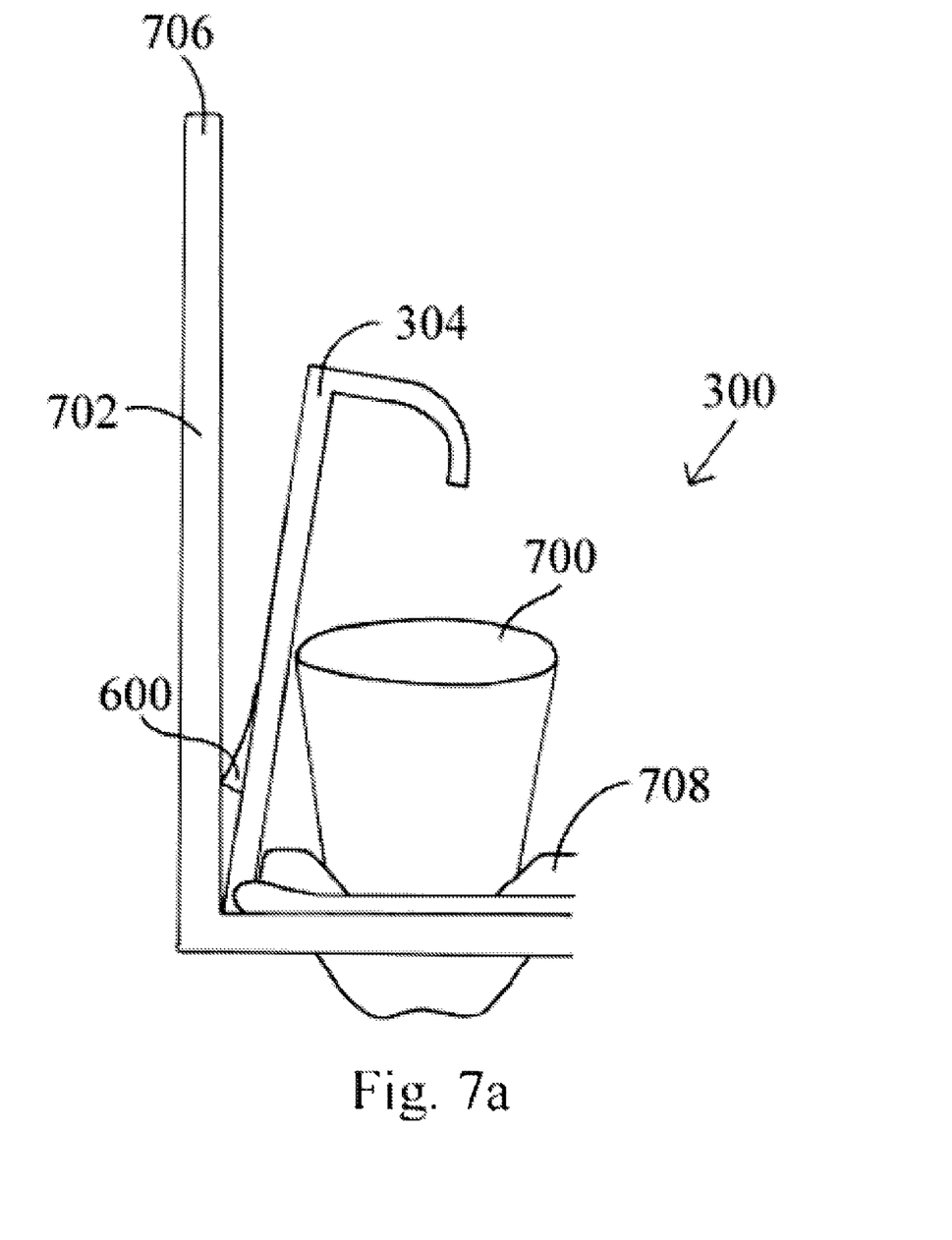
FIG. 7a is a cutaway side view illustrating a portion of the insert shown in FIG. 3 placed in a lowered position inside the beverage carrier shown in FIG. 1.

FIG. 7a is a cutaway side view illustrating a portion of insert 300 placed in a lowered position inside beverage carrier 100 with a disposable drink carrier 708 placed into insert 300. Shown is insert 300 holding a beverage 700 within disposable drink carrier 708, frame 302, placement handle 304, flange 600, beverage carrier sidewall 702, beverage carrier bottom 704, and beverage carrier rim 706. In this position, placement handle 304 is deformed slightly inward, or towards the center of insert 300, due to the physical relationship between flange 600 and an inner wall of beverage carrier 100 sidewall 702, as shown. The actual deformation of handle 304 may be greater or less than what is shown in other embodiments, depending on, for example, the size of flange 600 and its location along handle 304.

Figure 7B:
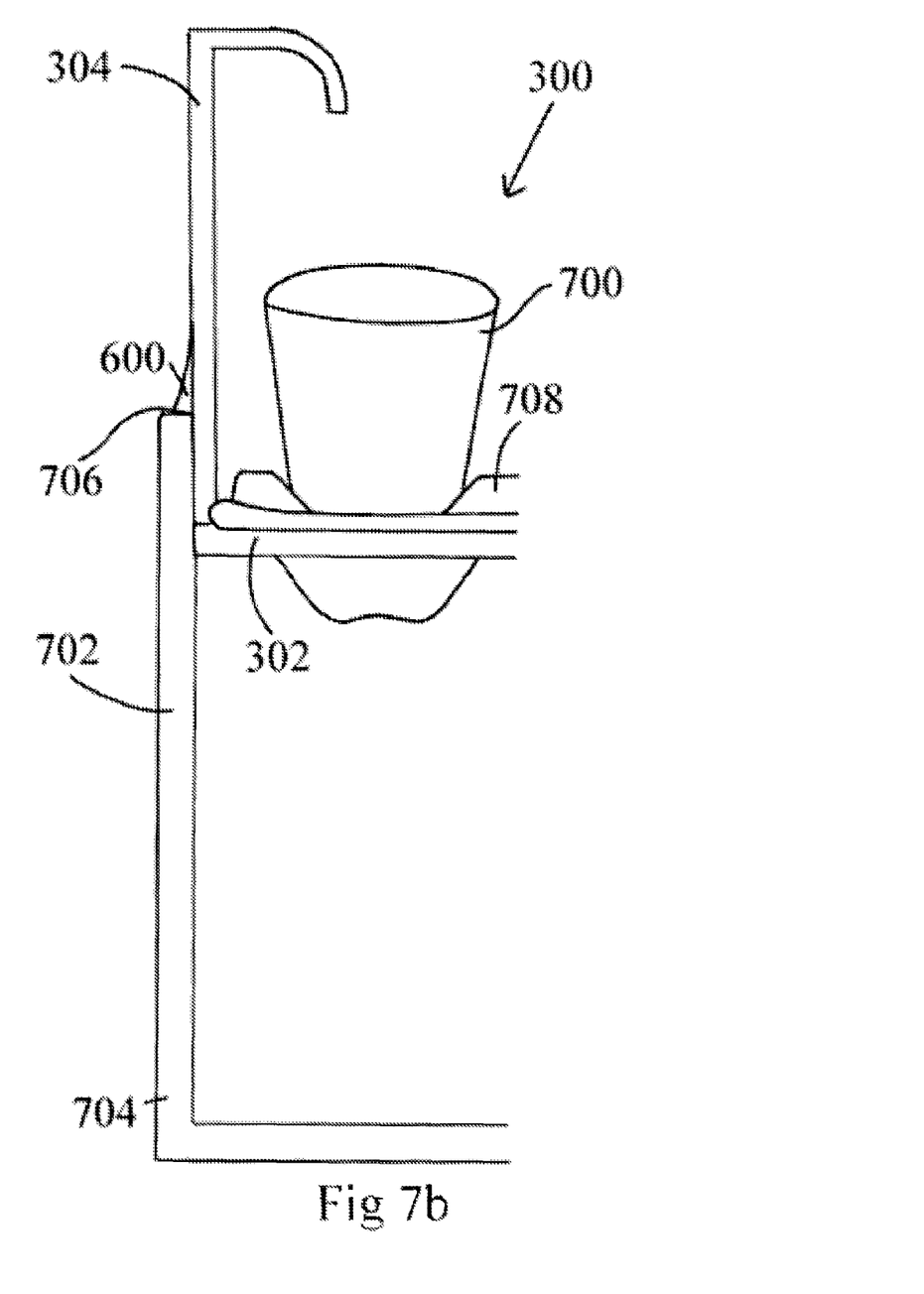
FIG. 7b is a cutaway side view illustrating the same portion of the insert shown in FIG. 3 placed in a raised position inside the beverage carrier of FIG. 1.

FIG. 7b is a cutaway side view illustrating the same portion of insert 300 placed in a raised position inside beverage carrier 100. This position would be used to place disposable drink carrier 708 into insert 300 or during removal of the drink carrier 708. In this position, frame 302 is located a few inches below rim 706. Flange 600 is engaged with rim 706 to provide support for insert 300. This allows insert 300 to remain securely positioned, while disposable drink carrier 708 is held within frame 302. After frame 302 has been loaded with disposable drink carrier 708, it may be lowered into beverage carrier 100 by gently squeezing placement handles 304 towards one another, allowing support 600 to become disengaged with rim 706, then lowering insert 300 into beverage carrier 100 using placement handles 304.

After transport, insert 300 is placed into a raised position using placement handles 304, wherein flange 600 engages rim 706. At that point, insert 300 is securely supported, allowing the disposable drink carrier 708 to be removed.

Figure 8A:
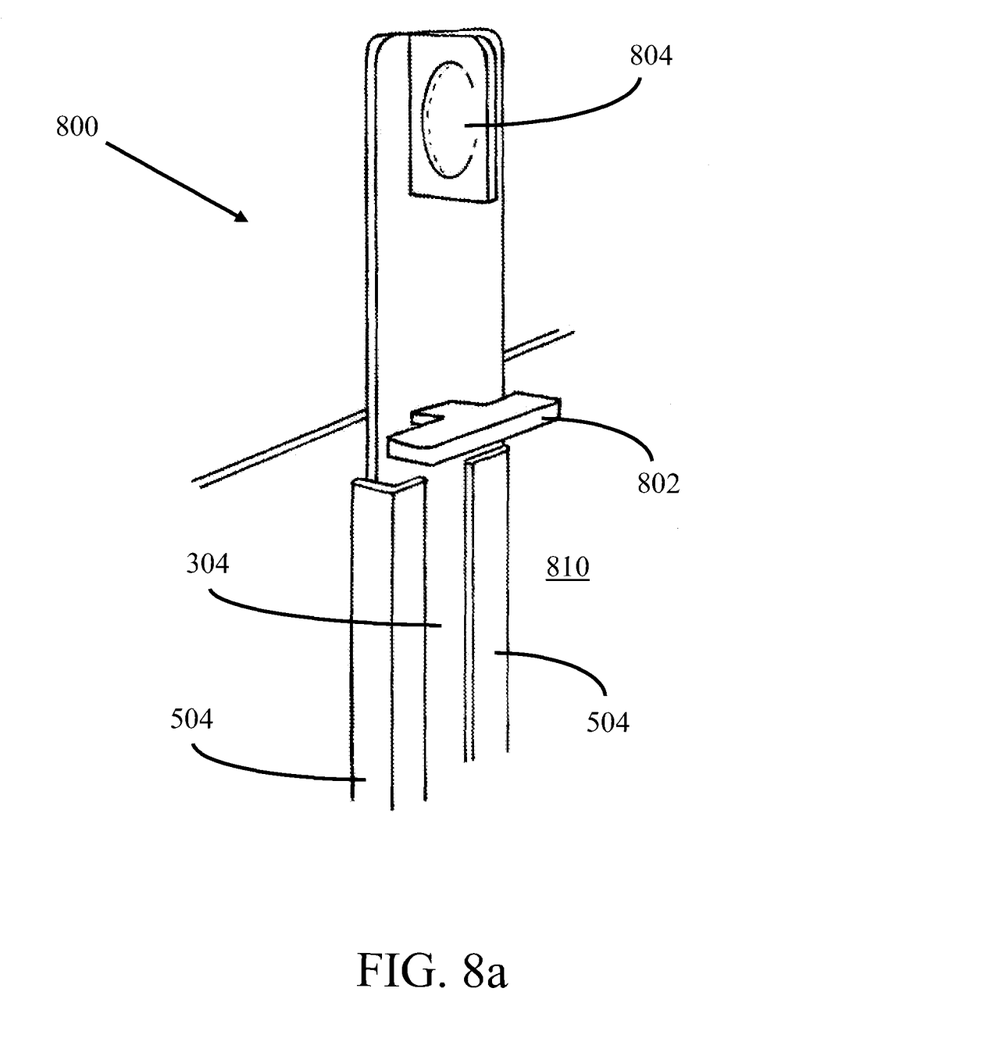
FIG. 8a is a perspective view of another embodiment of a portion of the insert shown in FIG. 3.

FIG. 8a is a perspective view of another embodiment of a portion of the insert shown in FIG. 3. Specifically, FIG. 8a illustrates a stop structure 800 located along placement handle 304 of insert 300, used in conjunction with guide 504 against inside wall 810 of first side wall 102 to secure insert 300 into a raised position inside of the box-type structure. This allows for easy loading and un-loading of insert 300 with a disposable beverage carrier before and after transport. FIG. 8a illustrates the stop structure 800 in such a position, with stop 802 resting on a top portion of guide 504. It should be understood that the tab structure shown in FIG. 8a could additionally be used on the other placement handle 304 of insert 300 (not shown). It should also be understood that stop 802 could, in other embodiments, be sized and shaped in any number of alternative arrangements.

In this embodiment, placement handle 304 comprises a structure that is formed to slide within guide 504 shown in FIG. 8a as being rectangular in cross section. Placement handle 304 is attached to frame 302 on one end and, in the embodiment shown, additionally comprises a tab 804 for lifting insert 300 in and out of the box-type structure. Tab 804 may be absent in other embodiments without affecting the operation of stop structure 800.

To lower insert 300 into the box-type structure, placement handle 304 is pushed away from the inner wall upon which guide 504 is attached, such as first side wall 102 as shown in FIG. 1. This allows stop 802 to clear guide 504, allowing placement handle 304, as well as tab 804, to slide down through guide 504, until insert 300 comes in contact with a bottom of the box-type structure. Stop 802, thus, is formed to slide outside of guide 504 when placement handle 304 is positioned away from a side wall and to engage the top of guide 504 while placement handle 304 is positioned toward the side wall. Stop 802 is generally placed along placement handle 304 just above frame 302, so that when insert 300 is in a secured position, a disposable drink carrier placed within insert 300 can be easily removed.

Figure 8B:
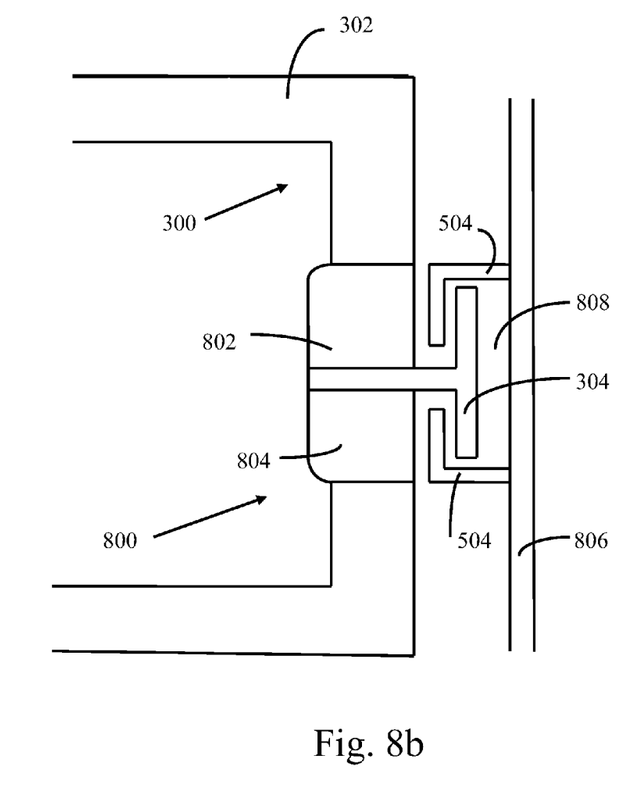

FIG. 8b is a top, plan view of stop structure 800, including tab 804 and stop 802, frame 302, placement handle 304, and guide top portion 504 secured against a side wall 806 of the box-type structure. FIG. 8b illustrates insert 300 in a lowered position, resting on the bottom of the box-type structure. In this position, placement handle 304 is positioned away from side wall 806, pushing stop 802 outside of a channel 808 formed by guide 504, while placement handle 304 and optional tab 804 are able to slide within channel 808.

The previous description of the preferred embodiments is provided to enable any person skilled in the art to make and use the present invention. The various modifications to these embodiments will be readily apparent to those skilled in the art, and the generic principles defined herein may be applied to other embodiments without the use of the inventive faculty. Thus, the present invention is not intended to be limited to the embodiments discussed herein, but is to be accorded the widest scope consistent with the principles and novel features disclosed herein.

We claim:

1. A beverage carrier, comprising:
    four side walls and a bottom joined together to form an open box-type structure, wherein the open box-type structure comprises an opening sized and shaped to allow a disposable, multi-cup carrier to be placed inside the box-type structure, the disposable, multi-cup carrier capable of carrying at least two cups, each of the cups filled with a liquid;
    an insert for placing and retrieving the disposable multi-cup carrier inside the box-type structure, the insert comprising a frame which forms a substantially square opening, the substantially square opening sized and shaped for supporting the disposable multi-cup carrier along an underside perimeter of the disposable multi-cup carrier, the frame additionally comprising at least one placement handle connected to the frame for raising and lowering the disposable multi-cup carrier into and out of the box-type structure;
    a guide formed vertically on one of the four side walls that contains the placement handle and allows the placement handle to slide vertically therein; and
    means for removably securing the box-type structure to a portion of a vehicle interior;
    wherein the placement handle additionally comprises a stop structure extending towards a center of the insert and that interferes with the guide when the insert is in a first raised position and disengages the guide for placement of the insert within the box-type structure when the placement handle is in a second raised position.

2. The portable beverage carrier of claim 1, further comprising:
    a flange located on the placement handle, the flange for engaging a lip of the box-type structure and preventing the insert from sliding into the box-type structure, while allowing the insert to be lowered into the box-type structure if the flange is dis-engaged from the rim.

3. The portable beverage carrier of claim 1, wherein the means for removably securing the box-type structure to a portion of a vehicle interior comprises a clip for attaching to a vehicle seat belt strap.

4. The portable beverage carrier of claim 1, wherein the means for removably securing the box-type structure to a portion of a vehicle interior comprises a tail, the tail sized and shape to slide between a vehicle seat and a vehicle seat back.

5. The portable beverage carrier of claim 1, further comprising:
    a lid sized and shaped to cover the opening; and
    a hinge attached lattitudinally along one of the four side walls and lattitudinally to the lid.

6. The portable beverage carrier of claim 1, further comprising an insulating layer disposed on an inner surface of four side walls.

7. The portable beverage carrier of claim 5, further comprising a handle attached to an outer surface of the lid.

8. The portable beverage carrier of claim 5, further comprising a handle that is built into the lid.

9. A carrying device to transport beverages, comprising:
    four side walls and a bottom joined together to form an open box-type structure;
    a disposable multi-cup carrier capable of holding two or more cups, each of the two or more cups containing a liquid;
    an insert for supporting the disposable multi-cup carrier, for placing the disposable multi-cup carrier inside the box-type structure, and for removing the disposable cup holder from the box-type structure, the insert comprising:
        a horizontally-positioned frame having an opening sized and shaped to support the disposable multi-cup carrier along an underside of a perimeter of the disposable multi-cup carrier; and
        at least one placement handle connected vertically and perpendicularly to the frame, for raising and lowering the disposable multi-cup carrier into and out of the box-type structure, the placement handle additionally comprising a stop structure extending towards a center of the insert, wherein the stop structure interferes with a guide disposed along an interior surface of the box-type structure when the insert is in a first raised position and disengages the guide when the placement handle is in a second raised position; and
    means for removably securing the box-type structure to a portion of a vehicle interior.

10. The carrying device of claim 9, wherein each of the at least one placement handles are deformable inward towards the center of the insert so as to disengage the stop structure from the guide and allow the insert to be lowered into the box-type structure.

11. The beverage carrier of claim 1, wherein the first raised position comprises an upper portion of the placement handle being positioned away from the center of the insert and the second raised position comprises the upper portion of the placement handle being positioned towards the center of the insert.

12. The beverage carrier of claim 9, wherein the first raised position comprises an upper portion of the placement handle being positioned away from the center of the insert and the second raised position comprises the upper portion of the placement handle being positioned towards the center of the insert.

13. The beverage carrier of claim 1, wherein the stop structure comprises a "T" shaped element formed perpendicularly to a surface of the placement handle.

14. The carrying device of claim 9, wherein the stop structure comprises a "T" shaped element formed perpendicularly to a surface of the placement handle.

* * * * *